United States Patent
Loken-Kim

[11] Patent Number: 5,416,892
[45] Date of Patent: May 16, 1995

[54] BEST FIRST SEARCH CONSIDERING DIFFERENCE BETWEEN SCORES

[75] Inventor: Kyung-ho Loken-Kim, Yokohama, Japan

[73] Assignee: Fujitsu Limited, Kawasaki, Japan

[21] Appl. No.: 110,799

[22] Filed: Aug. 23, 1993

Related U.S. Application Data

[63] Continuation of Ser. No. 666,050, Mar. 7, 1991, abandoned.

[30] Foreign Application Priority Data

Mar. 7, 1990 [JP] Japan .................. 2-056043

[51] Int. Cl.⁶ .............................. G10L 1/00
[52] U.S. Cl. ...................... 395/51; 381/42; 381/43; 382/181; 382/187
[58] Field of Search ............... 395/51; 381/43, 42; 382/10, 13, 9, 19, 36

[56] References Cited

U.S. PATENT DOCUMENTS

| | | | |
|---|---|---|---|
| 4,468,756 | 8/1984 | Chan | 364/900 |
| 4,555,796 | 11/1985 | Sakoe | 381/43 |
| 4,596,031 | 6/1986 | Hakaridani et al. | 381/43 |
| 4,658,429 | 4/1987 | Orita et al. | 382/36 |
| 4,713,777 | 11/1987 | Klovstad et al. | 395/2 |
| 4,718,088 | 1/1988 | Baker et al. | 395/2 |
| 4,718,094 | 1/1988 | Bahl et al. | 381/43 |
| 4,748,670 | 5/1988 | Bahl et al. | 381/43 |
| 4,765,763 | 8/1988 | Ishikawa | 400/121 |
| 4,770,843 | 9/1988 | Taleyarkhan | 364/138 |
| 4,783,803 | 11/1988 | Baker et al. | 381/43 |
| 4,805,100 | 2/1989 | Ozeki | 364/900 |
| 4,899,290 | 2/1990 | Hartzband | 395/51 |
| 4,979,101 | 12/1990 | Takahashi | 364/200 |
| 5,029,223 | 7/1991 | Fujisaki | 382/13 |
| 5,067,165 | 11/1991 | Nishida | 382/19 |
| 5,125,022 | 6/1992 | Hunt et al. | 381/43 |
| 5,133,012 | 7/1992 | Nitta | 381/43 |
| 5,185,813 | 2/1993 | Tsujimoto | 382/9 |

*Primary Examiner*—Allen R. MacDonald
*Assistant Examiner*—George Davis
*Attorney, Agent, or Firm*—Staas & Halsey

[57] ABSTRACT

A best first search for problem-solving in an artificial intelligence system employing a novel search priority index is disclosed. The search priority index is calculated based on a difference between scores of a node and the next node in breadth. Searching steps required to attain a solution can be reduced by employing the search priority index.

18 Claims, 10 Drawing Sheets

CANDIDATE CHARACTER (MATCH SCORE)

FIG. 3

| INPUT CHARACTER RANKING | FIRST CHARACTER (SPECIES) | SECOND CHARACTER (ALIKE) | THIRD CHARACTER (DEGREE) 50 |
|---|---|---|---|
| 1 | 52 — (HOPE) (2458) | (ALIKE) (2237) | (CHINA) (2427) |
| 2 | 54 — (SPECIES) (2497) | (REFERENCE) (2636) | (DEGREE) (2436) |
| 3 | 56 — (BREAKDOWN) (2582) | (OTHER) (2644) | (JOY) (2779) |
| 4 | 58 — (TIE) (2717) | (TEMPORARY) (3100) | (SHOP) (2847) |

CANDIDATE CHARACTER (MATCH SCORE)

FIG. 6

| | | |
|---|---|---|
| 52 ~ (HOPE) | (2458) | ↘ 39 |
| 54 ~ (SPECIES) | (2497) | ↗ |
| | | ↘ 85 |
| 56 ~ (BREAKDOWN) | (2582) | ↗ |
| | | ↘ 135 |
| 58 ~ (JOY) | (2717) | ↗ |
| MEAN VALUE | 259/3 = 86 | |

FIG. 7

| 56 | 62 | 64 |
|---|---|---|
| (HOPE) (2458)<br>PI = 0 | (ALIKE) (2237)<br>PI = 0 | (CHINA) (2427)<br>PI = 0 |
| 56 — (SPECIES) (2497)<br>PI = 1351 | (REFERENCE) (2636)<br>PI = 4127 | (DEGREE) (2436)<br>PI = 191 |
| 58 — (BREAKDOWN) (2582)<br>PI = $1.6 \times 10^5$ | (OTHER) (2644)<br>PI = 4516 | (JOY) (2779)<br>PI = $4.0 \times 10^5$ |
| ⋮ | ⋮ | ⋮ |

Fig. 13

| LINE-1 | LINE-2 | LINE-3 | | LINE-n |
|---|---|---|---|---|
| A-TYPE (93) | D-TYPE (80) | C-TYPE (70) | ... | A-TYPE (105) |
| B-TYPE (95) | A-TYPE (90) | B-TYPE (98) | ... | B-TYPE (180) |
| C-TYPE (210) | B-TYPE (300) | A-TYPE (230) | ... | C-TYPE (185) |

BEST FIRST SEARCH CONSIDERING DIFFERENCE BETWEEN SCORES

This application is a continuation of application Ser. No. 07/666,050, filed Mar. 7, 1991, now abandoned.

BACKGROUND OF THE INVENTION

1. Field of the Invention

The present invention relates to a search method for problem-solving in an artificial intelligence computer system, more precisely, a searching method which is useful, for example, in finding a correct word or sentence from a candidate lattice of characters or words, in a character recognition system or a speech recognition system.

2. Description of the Related Art

In a character recognition system, data of a word comprising several characters are input from an input tablet. The system compares input patterns extracted from the data with prepared standard patterns relating to individual characters, and outputs several candidates of characters and their match scores which are a measure of similarity of the candidate to the input character. A candidate lattice is constructed from the candidates each having match scores, and the candidate lattice is searched according to a predetermined procedure.

Whether the current candidate is correct is decided by collating with a word dictionary, by checking the grammar, or by a user checking the displayed word or sentence.

Usually, a depth first search is employed as the search procedure of the candidate lattice. Generally, the depth first search requires numerous searching steps to attain the correct candidate in this type of candidate lattice.

A best first search which is a kind of a breadth first search, wherein a more likely candidate, i.e., a candidate having a smaller match score is searched prior to others, is known. The conventional best first search, however, sometimes requires excessive searching steps, because only the absolute values of the match scores are considered, but the relationship with a next likely candidate is not considered.

SUMMARY OF THE INVENTION

It is the object of the present invention to provide a search method wherein a candidate lattice for character recognition, speech recognition, or other problem-solving in artificial intelligence can be efficiently searched.

In accordance with the present invention, a method of searching a lattice for problem-solving in artificial intelligence, the lattice including nodes having their own scores, the lattice having depth and breadth, comprises the steps of calculating differences between the scores of a node and the next node in the breadth, calculating search priority indexes based on the differences for each of the nodes, and searching the lattice according to the search priority indexes.

It is preferable that the method comprises the step of calculating mean values of the score differences within each depth, and the search priority indexes are calculated based on the score differences, the mean values, and the breadth, for each of the nodes.

BRIEF DESCRIPTION OF THE DRAWINGS

FIG. 3 is a drawing of a display screen showing recognition results of a character recognizer 37 shown in FIG. 2;

FIGS. 6, 7 and 8 are diagrams for explanation of the search method according to the first embodiment of the present invention;

FIG. 13 is a diagram of a candidate lattice in a typical quasi-optimization problem.

DESCRIPTION OF THE PREFERRED EMBODIMENTS

Figure 1:
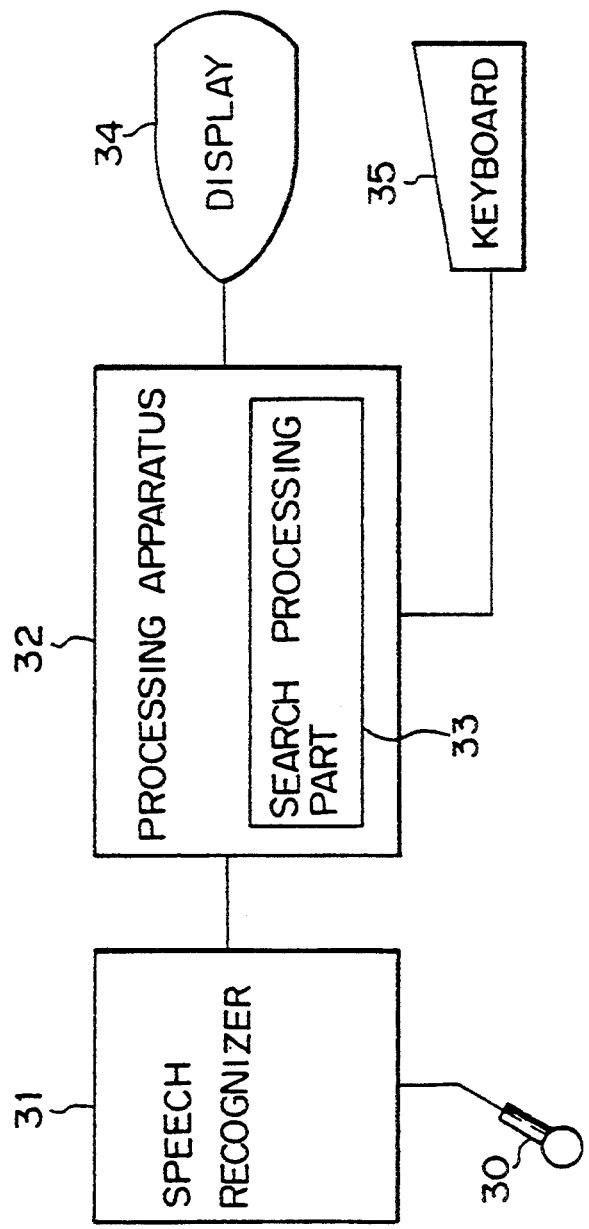
FIG. 1 is a block diagram of a speech recognition system.
Figure 2:
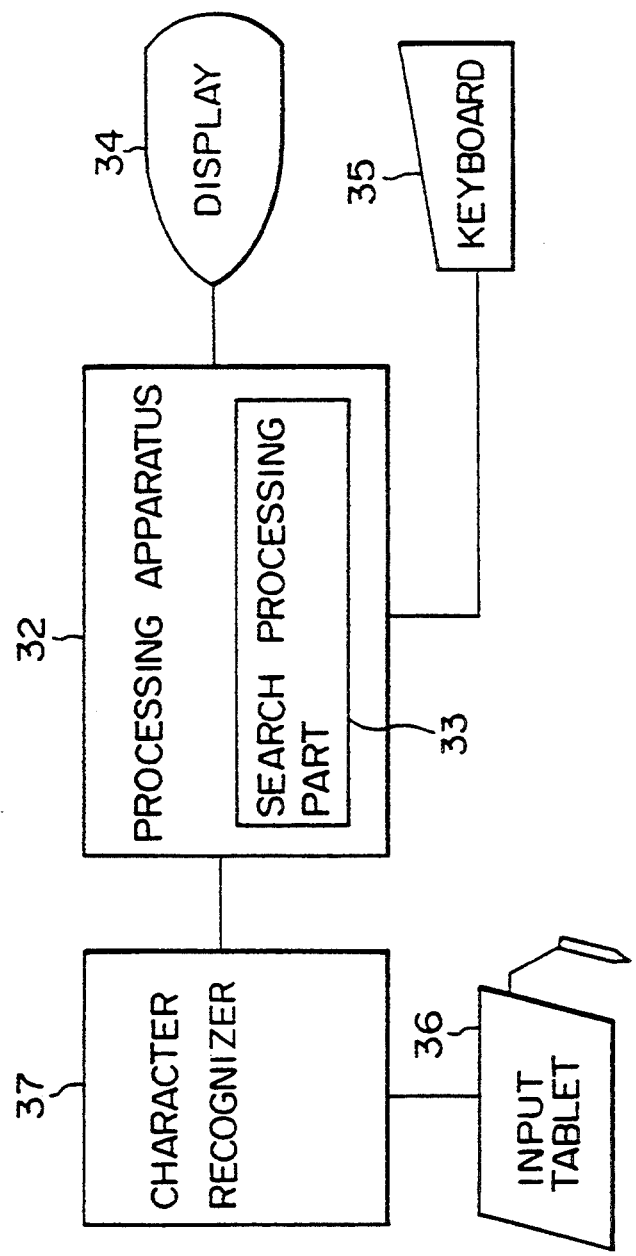
FIG. 2 is a block diagram of a character recognition system.

FIG. 1 is a block diagram of an example of a speech recognition system, and FIG. 2 is a block diagram of an example of a character recognition system, both of which the present invention can be applied to.

In the speech recognition system shown in FIG. 1, a speech recognizer 31 generates candidate words for words input from a microphone 30, and generates match scores which are a measure of similarity of the stored pattern and the input words. In the character recognition system shown in FIG. 2, a character recognizer 37 generates candidate characters for input characters from an input tablet 36, and generates match scores which are a measure of similarity of the stored pattern and the input characters.

A processing apparatus 32 shown in FIGS. 1 and 2 comprises a central processing unit (CPU) and storages. The processing apparatus 32 may be implemented by, for example, a personal computer. The processing apparatus 32 inputs the candidates and their match scores from the speech recognizer 31 or the character recognizer 37. A search processing part 33 comprised in the processing apparatus 32 searches the candidates accompanied by the match scores, to find a correct sentence or a word. The search processing part 33 is implemented by software which is stored and executed in the processing apparatus 32. A display 34 is used, for example, to display recognition results including candidate characters and their match scores. A keyboard 35 is used, for example, to register words for recognition.

FIG. 3 is a drawing of a display screen showing the recognition result of the character recognizer 37 after a word 50 has been input from the input tablet 36. For example, candidate characters 52, 54, 56 and 58 are generated from the first character 60, and their match scores are 2458, 2497, 2582, and 2717, shown in parenthesis, respectively. A smaller value match score means higher similarity. Underlines denote correct candidates.

Before describing the preferred embodiments according to the invention, examples of aforementioned related art are given with reference to the accompanying drawings.

Figure 4:
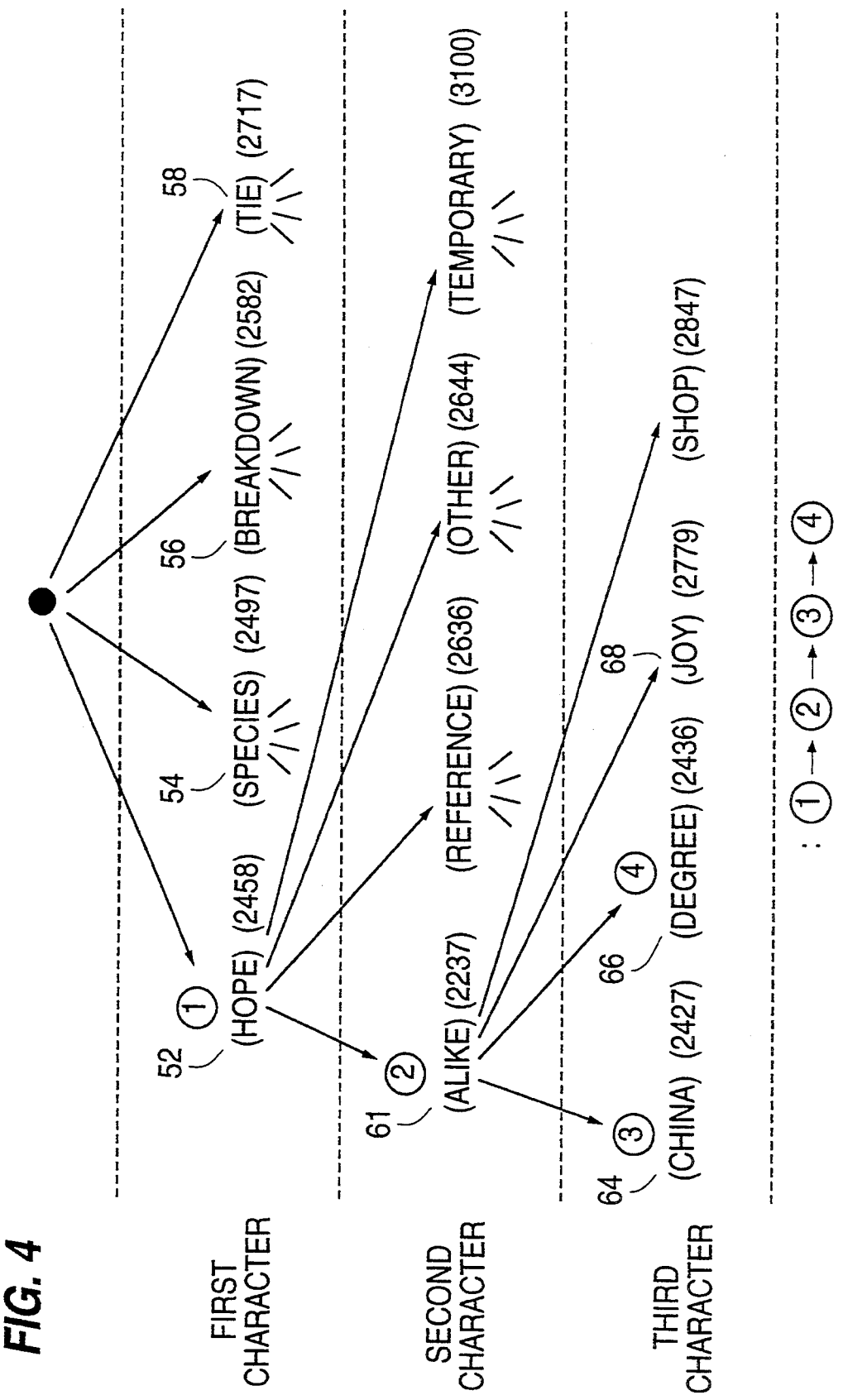
FIG. 4 is a diagram showing a candidate lattice, and for explaining a depth first search.

FIG. 4 is a diagram showing a candidate lattice or tree constructed from the recognition result shown in FIG. 3, and explaining the depth first search of the candidate lattice.

In the depth first search, search proceeds sequentially generating character combinations in the order of ①→②→③→ . . . Namely, the character combination is searched in order of "52, 62, 64"→"52, 62, 66"→"52, 62, 68"→ . . . Consequently, eighteen searching processes are required to attain the correct word 50, i.e. "54, 62, 66", in this example.

In the conventional best first search, a character having a smaller match score is searched prior to other characters. Namely, the search proceeds in the order of "52, 62, 64"→"52, 62, 66"→"54, 62, 64"→"54, 62, 66". Four search steps are sufficient to attain the correct word 50, i.e. "54, 62, 66", in this example.

However, in some cases, for example, where candidate characters for an input character have smaller match scores altogether, a large number of search steps is sometimes required. For example, if the candidate characters 52, 54, 56, and 58 of the input character 60 had match scores of 1458, 1497, 1582, and 1717, respectively, only the candidates of the input character 60 would be searched first, so that a large number of search steps would be required to attain the correct candidate "54, 62, 66".

According to experiments with a character recognition, the candidate characters and their match scores have been found to have the following properties:

(i) Among candidate characters for a character of an input word, a candidate character having a certain ranking has a much greater probability of being a correct candidate than the next ranking candidate character. For example, candidate characters of more than fifth ranking have very little probability of being correct.

(ii) When the difference between match scores of second and third candidate characters is large, the first or the second candidate characters are much more probable.

These properties also appear in speech recognition systems. Therefore, it is expected that a best first search considering these properties could attain the correct candidate in a smaller number of search steps than in the aforementioned related art.

The preferred embodiments of the present invention will now be described with reference to the accompanying drawings.

First Embodiment of the Present Invention

Figure 5:
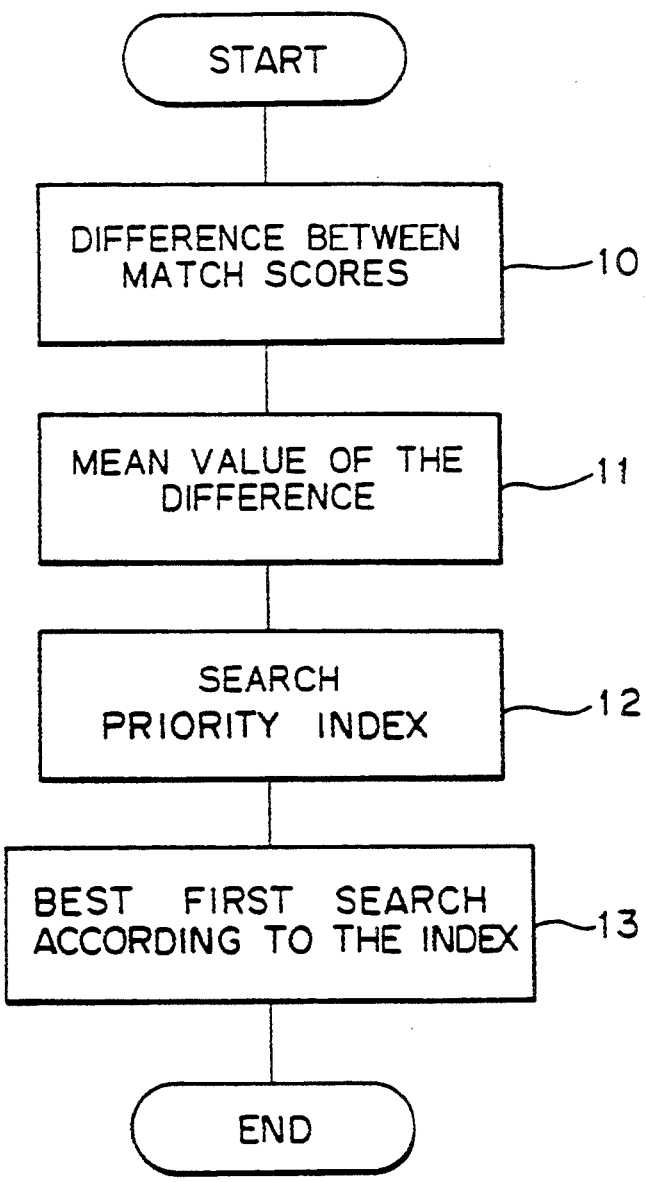
FIG. 5 is a flowchart of a search method according to a first embodiment of the present invention.
Figure 8:
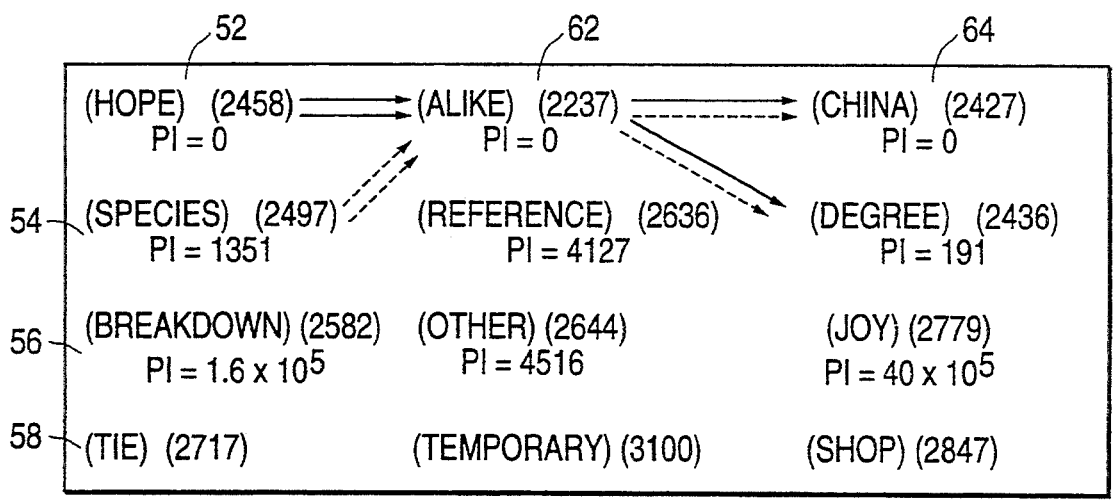

FIG. 5 is a flowchart showing a search method of a candidate lattice according to the first embodiment of the present invention. FIGS. 6 to 8 are diagrams for explanation of the method.

As an example, a search process for the candidate characters as described with reference to FIG. 3 is described. First, the differences between the match scores of the neighboring candidate characters for a character are calculated (step 10 in FIG. 5), as shown in FIG. 6. In this example, the difference between the match scores of the candidate characters 52 and 54 is 2497−2458=39. Also, the difference between the match scores of the candidate characters 54 and 56 is 85, and the difference between the match scores of 56 and 58 is 135 as shown in FIG. 6.

Next, mean values of the difference between the match scores are calculated (step 11). In this example, the mean value becomes (39+85+135)/3=86, as also shown in FIG. 6.

A search priority index PI of a candidate of ranking i is calculated from the difference between the match scores and the mean value according to the following equation (step 12).

$$PI=0; \text{ for } i=1, \text{ and } PI=(MS_i-MS_{i-1})/(\text{mean value}) \times e^{Ci}; \text{ for } i=2, 3 \ldots,$$

wherein $MS_i$: match score of a candidate of ranking i, and

C: constant

In this example, if C=4, the search priority index PI of the candidate character 54 becomes $(2497-2458)/86 \times e^{4 \times 2}=1351$. FIG. 7 shows the search priority indexes PI of several candidate characters, when C=4.

A best first search is executed according to the calculated search priority index PI (step 13). In the best first search, a character having a smaller PI value is searched prior to others. As shown in FIG. 8, in this example, the search is executed in the order of "52, 62, 64"→"52, 62, 66"→"54, 62, 64"→"54, 62, 66" are required to attain the correct candidate.

Second Embodiment of the Present Invention

Figure 10:
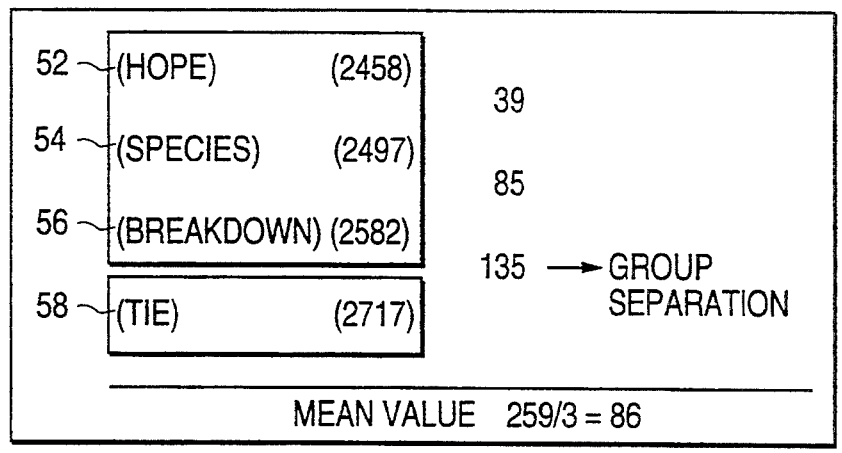
FIGS. 10, 11 and 12 are diagrams for explanation of the search method according to the second embodiment of the present invention.
Figure 9:
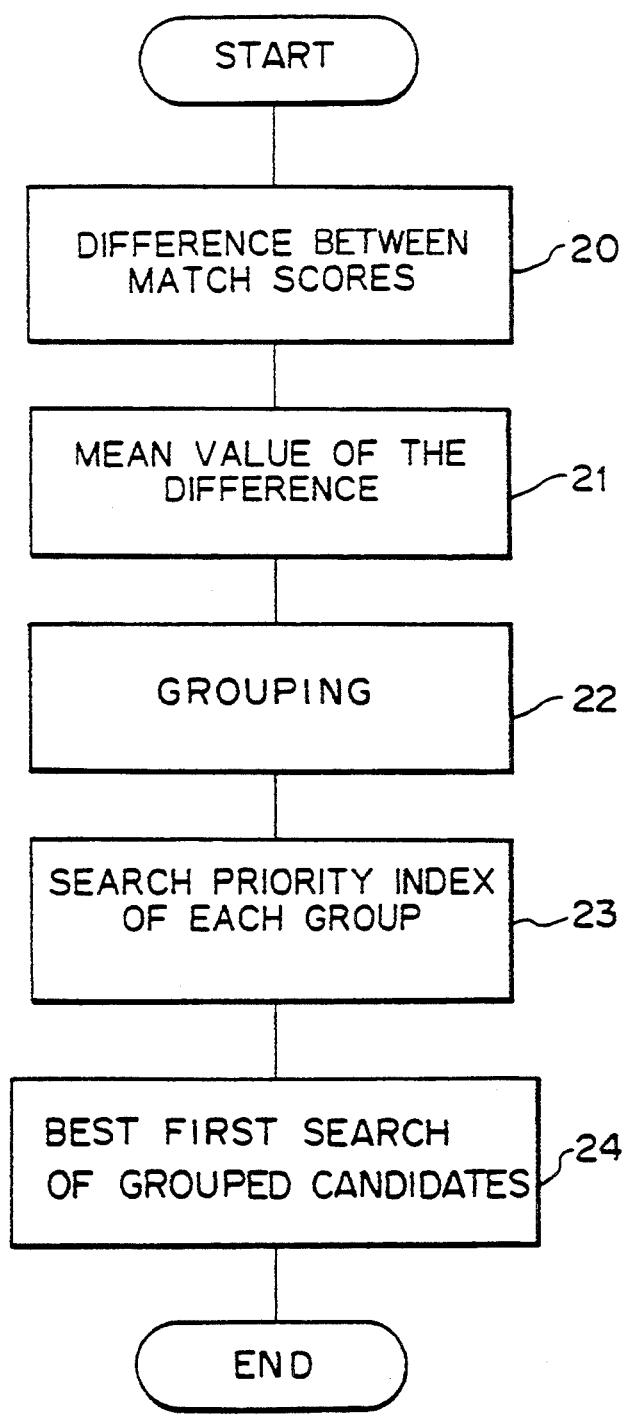
FIG. 9 is a flowchart of a search method according to a second embodiment of the present invention.
Figure 11:
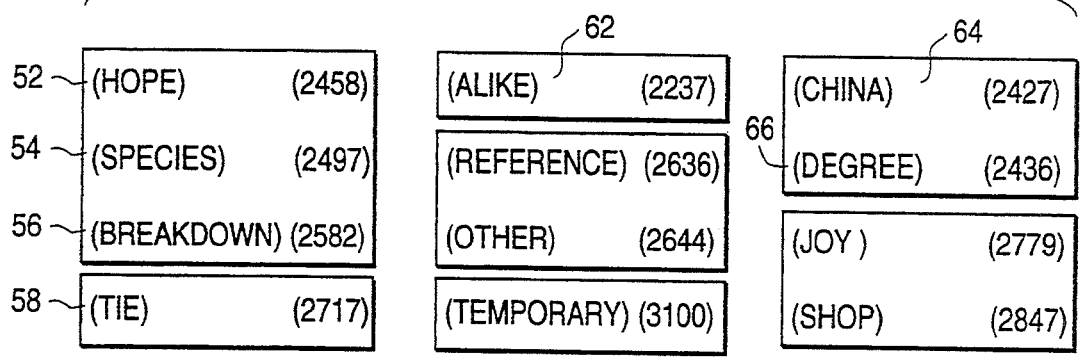
Figure 12:
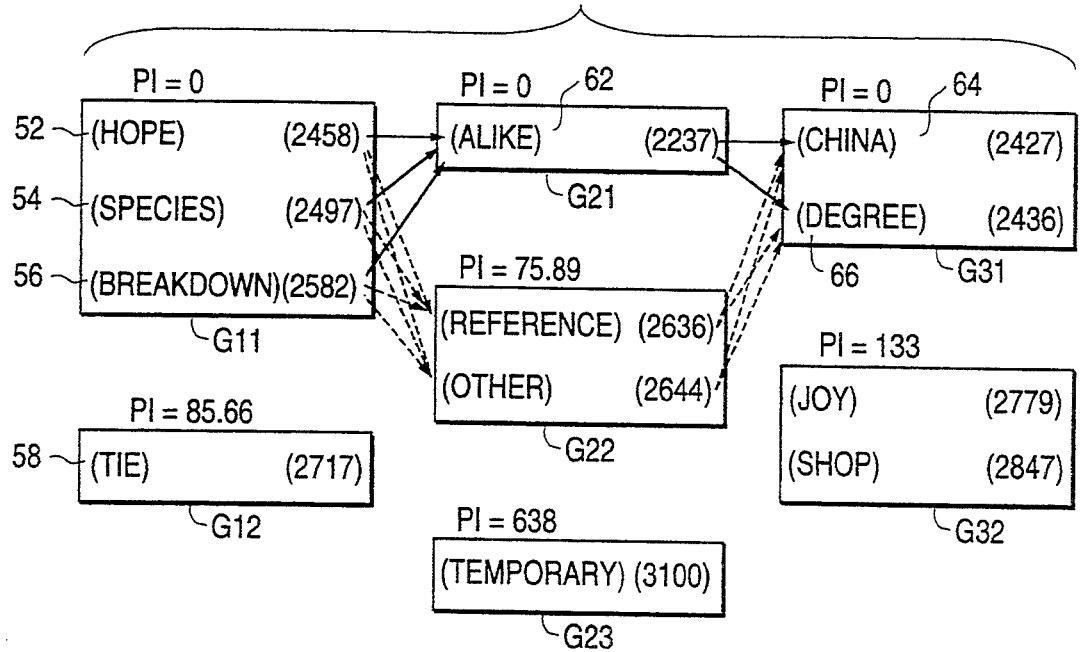

FIG. 9 is a flowchart showing a search method of a candidate lattice according to the second embodiment of the present invention. FIGS. 10 to 12 are diagrams for the explanation of the method.

First, the difference between the match scores of the neighboring candidate characters for a character and their mean value are calculated (step 20 and 21), as shown in FIG. 10.

Next, the difference between the match scores of the neighboring candidates are compared with the mean value. If the difference is smaller than the mean value, the two neighboring candidates are grouped together, and if the difference is larger than the mean value, the two neighboring candidates are separated to different groups, so that the candidates for a character are grouped. As shown in FIG. 10 since the characters having match scores of (2582) and (2717) have a difference of 135 greater than the mean value 86, these two characters are separated into separate groups. In this way all candidates are grouped, as shown in FIG. 11 (step 22).

A search priority index PI of a group of ranking i is calculated according to the following equation (step 23)

$$PI=0; i=1, \text{ and } PI=(MST_i-MSF_{1-1})/(\text{mean value}) \times e^{Ci}; i=2, 3 \ldots,$$

wherein $MST_i$: match score of the top candidate of a group of ranking i, $MSF_i$: match score of the final candidate of a group of ranking i, and C: constant.

FIG. 12 shows the calculated search priority indexes PI of the groups G11 to G32, when C=2.

Then, a best first search of the grouped candidates is executed according to the search priority index PI (step 24), as shown in FIG. 12. At first, a candidate combination is selected from the groups G11, G21, and G31, which have the lowest search priority indexes, are searched. If a correct candidate combination is not obtained from these combinations, additional character combinations selected from the groups G11, G22, and G31 are searched. Selection of candidates from a group combination is carried out according to a depth first search or breadth first search.

In this example, the search is executed in the order of "52, 62, 64"→"52, 62, 66"→"54, 62, 64"→"54, 62, 66", and four steps are required to attain the correct candidate.

In the aforementioned searching processes, whether or not a current candidate combination is correct is decided by collating the candidate word with a word dictionary, by checking the grammaticality of the candidate sentences, or by a user checking a displayed word or sentence. As this decision is not essential to the present invention, a detailed explanation thereof is left out.

Though the foregoing description is focused on character recognition, the present invention can, of course, be applied to speech recognition wherein a word or sentence is input in the form of a speech signal and candidates of syllables, words, or clauses are searched.

Furthermore, the present invention can also be applied to general quasi-optimization problems. FIG. 13 shows a typical quasi-optimization problem as follows. There are n production lines in an automobile factory. The numbers in parentheses represent the costs required to produce a vehicle of a corresponding type. Even for the same type of automobile, production costs are different in different production lines. The time required to produce a vehicle is assumed to be equal in all production lines. The problem is to find a quasi-optimum combination wherein predetermined numbers of A to D type vehicles are produced in all production lines at low production cost. In the candidate lattice shown in FIG. 13, the production costs in parentheses correspond to the match score in a character recognition system or speech recognition system, and the numerals of the production lines correspond to the input order in the systems.

We claim:

1. A method of searching a lattice for problem-solving in artificial intelligence using a data processor, the lattice including nodes having present and next nodes each having node scores, and the lattice having depth and breadth, said method comprising the steps of:
   (a) inputting pattern data sets using an input device and storing the pattern data sets in a memory;
   (b) determining candidate patterns for each of the input pattern data sets;
   (c) generating pattern scores for the candidate patterns based on a similarity between the pattern data sets and the candidate patterns using the data processor to determine which candidate patterns are assigned to the nodes of the lattice so that the candidate patterns for each of the pattern data sets are arranged at a specific depth of the lattice in order of the breadth of the lattice according to the respective pattern scores thereof;
   (d) calculating differences between the node scores of the nodes with the same depth using the data processor;
   (e) calculating a search priority index for each of the nodes corresponding to the candidate patterns having a search priority based on the differences of the node scores of the nodes with the same depth using the data processor; and
   (f) searching the lattice according to the search priority indexes and finding patterns corresponding to the pattern data sets using the data processor.

2. A search method as claimed in claim 1, wherein the method comprises the step of calculating mean values of the score differences within each depth, and the search priority indexes are calculated based on the score differences, the mean values, and the breadth, for each of the nodes.

3. A search method as claimed in claim 2, wherein the breadth is defined by breadth i and the search priority index PI of one of the nodes in the breadth i is calculated according to the following equation:

$$PI=0; \text{ for } i=1, \text{ and } PI=(S_i-S_{i-1})/(\text{mean value})\times e^{Ci}; \text{ for } i=2, 3, 4 \ldots$$

wherein $S_i$: score of the one of the nodes of the breadth i, and
$C$: constant.

4. A search method as claimed in claim 3, wherein the one of the nodes is a candidate element for an input element generated by a recognizer connected to the input device which is supplied the input element from the input device, the score, $S_i$, is a match score of the candidate element generated by the recognizer, the lattice is a candidate lattice including the candidate element having the match score, the depth is the order of the input element, and the breadth is a rank of the candidate element for the input element.

5. A search method as claimed in claim 4, wherein the recognizer is a character recognizer.

6. A search method as claimed in claim 5, wherein the candidate element is a character, and the input element is supplied as a word to the character recognizer.

7. A search method as claimed in claim 5, wherein the candidate element is a character, and the input element is supplied as a sentence to the character recognizer.

8. A search method as claimed in claim 4, wherein the recognizer is a speech recognizer.

9. A search method as claimed in claim 8, wherein the candidate element is a syllable, a word, or a clause, and the input element is supplied as a word or a sentence to the speech recognizer.

10. A search method as claimed in claim 1, wherein the method comprises the steps of:
    calculating a mean value of each score difference within each depth; and
    grouping the nodes with corresponding search priority indices in groups within each depth according to whether the score differences are greater than the mean value,
    in the search priority indexes calculating step (e), the search priority indexes are calculated based on the score differences, the mean value, and the breadth of the lattice, for each of the groups, and
    in the searching step (f), the lattice is searched according to the search priority index of one of the groups which one of the nodes belongs to.

11. A search method as claimed in claim 10, wherein the breadth is defined by breadth i and the search priority index PI of the one of the groups in the breadth i is calculated according to the following equation:

$$PI=0; \text{ for } i=1, \text{ and } PI=(ST_i-SF_{i-1})/(\text{mean value})\times e^{Ci}; \text{ for } i=2, 3, 4 \ldots,$$

wherein $ST_i$: first score of a top node of a first group of the breadth i, $SF_i$: second score of a final node of a second group of the breadth i, and C: constant.

12. A search method as claimed in claim 11, wherein each of the nodes is a candidate element for an input element generated by a recognizer to which is supplied the input element, the first score is a match score of the candidate element generated by the recognizer, the lattice is a candidate lattice including the candidate element having the match score, the depth is order of the input element, and the breadth is a rank of the candidate element for the input element.

13. A search method as claimed in claim 12, wherein the recognizer is a character recognizer.

14. A search method as claimed in claim 13, wherein the candidate element is a character, and the input element is supplied as a word to the character recognizer.

15. A search method as claimed in claim 13, wherein the candidate element is a character, and the input element is supplied as a sentence to the character recognizer.

16. A search method as claimed in claim 12, wherein the recognizer is a speech recognizer.

17. A search method as claimed in claim 16, wherein the candidate element is a syllable, a word, or a clause, and the input element is supplied as a word or a sentence to the speech recognizer.

18. A method of symbol recognition using a data processor, comprising the steps of:
  (a) inputting a pattern data set into the data processor with the pattern data set representing an input symbol to be recognized;
  (b) identifying with the data processor candidate patterns for the pattern data set;
  (c) generating by the data processor similarity scores for the candidate patterns;
  (d) assigning by the data processor the candidate patterns to nodes of a search tree with level depth and left to right position based on the similarity scores;
  (e) determining by the data processor score differences between similarity scores of nodes at a same search tree level;
  (f) calculating by the data processor search priority indexes according to the score differences; and
  (g) determining by the data processor a candidate pattern best matching the pattern data set to recognize the input symbol by searching the search tree using the search priority indexes.

* * * * *